US007814415B2

(12) United States Patent
Cox

(10) Patent No.: US 7,814,415 B2
(45) Date of Patent: Oct. 12, 2010

(54) BYTECODE LOCALIZATION ENGINE AND INSTRUCTIONS

(75) Inventor: Alan Cox, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 1008 days.

(21) Appl. No.: 11/191,050

(22) Filed: Jul. 28, 2005

(65) Prior Publication Data

US 2006/0168130 A1 Jul. 27, 2006

Related U.S. Application Data

(60) Provisional application No. 60/629,297, filed on Nov. 19, 2004.

(51) Int. Cl.
*G06F 17/00* (2006.01)
(52) U.S. Cl. ........................ 715/249; 715/234
(58) Field of Classification Search ................ 715/234, 715/239, 249, 264
See application file for complete search history.

(56) References Cited

U.S. PATENT DOCUMENTS

| 5,553,239 | A | 9/1996 | Heath et al. |
| 5,828,876 | A | 10/1998 | Fish et al. |
| 6,601,108 | B1 | 7/2003 | Marmor et al. |
| 6,772,110 | B2 * | 8/2004 | Real et al. ........................ 704/8 |
| 7,363,482 | B2 * | 4/2008 | Zimmer et al. .................. 713/2 |
| 2002/0120654 | A1 * | 8/2002 | Xu ............................... 707/536 |
| 2006/0253508 | A1 * | 11/2006 | Colton et al. ................ 707/206 |
| 2006/0294127 | A1 * | 12/2006 | Nettles ........................ 707/101 |

OTHER PUBLICATIONS

Adams, Steve. Oct. 1999. *Oracle8i Internal Services: for Waits, Latches, Locks, and Memory*. O'Reilly & Associates, Inc. Sebastopool, California.
Shah, Jay. 1991. "VAXclusters and Other High-Availability Systems." *VAXclusters: Architecture, Programming and Management*. McGraw-Hill, Inc. p. 57-99.
Kenah, Lawrence J. et al. 1984. "VAX/VMS Lock Manager." *VAX/VMS Internals and Data Structures*. Digital Press. p. 244-263.
Unicode, Inc., "Special Areas and Format Characters", *The Unicode Standard, Version 4.0*, Chapter 15, Internet Publication, pp. 383-409 (2003).
European Search Report issued for European Patent Application No. 05257085.0-1243 on Oct. 10, 2007.

* cited by examiner

*Primary Examiner*—Stephen S Hong
*Assistant Examiner*—Manglesh M Patel
(74) *Attorney, Agent, or Firm*—Wilmer Cutler Pickering Hale and Dorr LLP

(57) ABSTRACT

A system and method for localizing or translating computer program output is presented. Some aspects provide embedded localization markup tags in program output such that a localization bytecode engine can use the localization markup tags to look up and execute corresponding localization instructions kept in storage. In some aspects, the localization instructions are stored in vendor-specific instruction space areas, for example, in the Unicode Supplementary Private use Area-A.

17 Claims, 5 Drawing Sheets

Application Program
160

.
.
.

```
instruction code(200)...
<markup code(220)> instruction code(202) <markup
code(222)> instruction code(204)...
instruction code(206)...
<markup code(224)> instruction code(208) <markup
code(226)> instruction code(210)...
```

BYTECODE LOCALIZATION ENGINE AND INSTRUCTIONS

RELATED APPLICATION

This application claims the priority of U.S. Provisional Application 60/629,297 filed on Nov. 19, 2004, which is incorporated herein by reference in its entirety.

TECHNICAL FIELD

The present application generally relates to computer programs and character sets, and more particularly to embedded flow control instructions for localization of computer programs.

BACKGROUND

Text symbols and scripted glyphs, sometimes referred to as characters, are stored and represented within digital systems in numeric coded form. To facilitate communication between two digital systems, e.g. two computers, it is useful to employ a shared format, or code, that is known to the two digital systems so that an encoded character is interpreted by the receiving digital system in the same way as it was intended by the sending digital system. The shared format may be a standardized format, having a specification that can be easily obtained or that is distributed with computer software and operating systems.

One widely-used code for representing a common set of characters in English and other Western languages is the ASCII (American Standard Code for Information Interchange), which has been in use in some form since the late 1950s. The ASCII definition allows for octet (8-bit) representation of the English alphabet (upper and lower case), the Arabic numerals (0-9), several punctuation and arithmetic symbols (e.g., #, $, +, ~) and some other control characters (e.g., Line Feed, Escape). The ASCII set employs 256 code values to uniquely represent the corresponding characters.

With the proliferation of digital communication and computing platforms around the world, shortcomings of limited codes, such as ASCII, arise. For example, with only 256 possible code values, the 8-bit ASCII cannot possibly uniquely represent every character or symbol used in every written language, mathematics, commerce, etc. As a result, different character sets have been used in place of the traditional ASCII characters set to accommodate other national (local) alphabets. Also, extensions to the basic code sets have been employed to expand the possible repertoire of characters that can be uniformly stored and communicated between digital information platforms. Without standardization of a universal character set, the same code value could be used by two (inconsistent) codes to represent two different characters. If inconsistencies (or overlapped use of code values) exist between character sets used by different users, a document prepared by one user may contain errors or misinterpreted data when read by another user. As a starting point, a larger and more flexible character code space is employed.

One standard code used to cover a much larger character space than ASCII is Unicode. Unicode is a superset of codes closely associated with the Universal Character Set, and is conformant with the ISO/IEC 10646 international standard and others, defining a very large character repertoire. One main purpose for the development of Unicode was to allow a uniform character set sufficiently deep that no character duplication or code value overlap is necessary. That is, a code that can reasonably accommodate all current (and some past) languages and written symbols that are likely to be encountered. Thus, almost any character, in almost any written language, as well as multitudes of mathematical, logical and symbolic characters are defined in Unicode.

As in other codes, Unicode assigns a numeric value and a name to each of its characters, and includes information regarding the characters' case, directionality, and other properties. Unicode is concerned with the interpretation and processing of characters rather than their physical rendered form or display properties as would appear on a computer screen for example. A 16-bit encoding is used for the default Unicode encoding, providing about 65,000 available characters, with extensions (called surrogates) further allowing for about 1 million possible characters. A Unicode Consortium of computing and communication industry representatives and individuals has been established to provide a forum for implementing such a universal code.

Some character code sets, such as Unicode, provide assigned locations in the code tables for various families of characters. For example, locations or blocks are allocated for Basic Latin, Cyrillic, Greek, mathematical operators, musical symbols, Braille symbols, arrows, currency symbols, etc. These are distinct from the familiar "font" variants, which are not encoded by Unicode at this time. Lists of the assigned characters, e.g., in the Unicode Standard Version 3.0, can be found at www.unicode.org.

In addition to the assigned families of character locations, some locations are defined in the Unicode standard to be vendor-defined supplementary private use areas. In fact, about 7,800 code values are unused by the current Unicode standard to allow for future expansion in the basic coding space. For example, Unicode Supplementary Private Use Area-A ("Area-A") is one such area that does not contain any character assignments. The locations occupied by Area-A are in the range F0000-FFFFD.

Even if a large code set is defined and standardized, a problem remains in converting and translating text and characters to and from languages having special rules, e.g., mutation rules. A mutation rule is usually context-dependent, and defines varying presentation forms of a character or a word as a function of context and environment, e.g., gender, tense, plural/singular form, isolated/initial/medial/final forms. Simple substitution of one character for another during translation can result in errors when translating languages having mutation rules, because one language does not generally have or follow the same mutation rules as another language. Better internationalization, or localization, capabilities are needed for cross- and multi-lingual software environments.

In the context of providing programs to a wider international customer base, converting user interfaces and other aspects of a program from one language to another is a challenge to programmers and software vendors. Mere translation of words by looking them up in electronic dictionaries is usually inadequate, and can lead to errors and unacceptable output, as language translation involves more than simple word or phrase substitutions. Internationalization or localization include schemes intended to eliminate such errors and inconsistencies, and provide for proper local forms of computer program output and interfaces.

Current systems do not handle conversion from one language to another well. For example, when implementing a computer program in different languages, programmers and software vendors must normally manually convert the user interface, output messages, etc. to the various languages to avoid errors. Mutation rules and other localization nuances make it impossible or impractical to convert computer output from one language to another by mere word or phrase substitution, such as is available using a dictionary. Therefore, improved and generalized ways to handle computer program output and data in multiple language environments is needed.

SUMMARY

Some aspects of the present disclosure are directed to localization schemes, methods, systems, and instructions to convert computer output from one form, or language, to another. Specific embodiments employ software instructions, referred to as a bytecode engine, designed to receive computer application output in a first, original, non-localized or partially-localized form, and convert the output to a corresponding localized output for display on a computer display device, for example, in a local format or language.

One or more embodiments include localization markup tags, embedded in computer program output instructions, that cause the bytecode engine to look up, retrieve, and execute localization instructions stored in a storage device. The storage device may include any computer memory device, and the localization instructions may be referred to using conventional Unicode code values. The Unicode values may be those of a normally unused vendor-specific area in the Unicode space, for example, the Supplementary Private Use Area-A, though the instructions are not limited to Area-A or to Unicode storage areas. In fact, any space that can be addressed or referred to by the markup tags may be used to hold localization instructions. Accordingly, code space assigned for vendor use as well as other memory space that can be directly or indirectly accessed responsive to the localization markup tags could hold the localization instructions. This includes memory space provided by the application program vendor or any other maker of hardware or software operating in conjunction with the application program. The term "instruction space" is used herein to refer to any of these types of code spaces or memory spaces that can be used for the purpose of holding the localization instructions, and an example of which is Area-A or an equivalent vendor-definable space.

Once the bytecode engine receives the localization markup tag and retrieves the corresponding localization instruction or group of instructions from memory, it executes or interprets the instructions to perform a desired localization function. The localization function may be, for example, a simple substitution, a conditional statement, or a complicated series of flow control logic.

Application programs traditionally provide output codes directly to a display engine, which in turn produces the signals for display on a display device, e.g., a computer monitor device. The present system and process introduce the bytecode engine in between the application program and the display engine to perform the conversion of output codes from the non-localized or partially localized original form to the localized form.

According to some aspects, the application program and the display engine are substantially unaffected or disturbed by the presence of the intermediary bytecode engine. Because the application program delivers its original non-localized (or partially localized) output to the bytecode engine, the application program is substantially unaffected by the localization process, which is a desirable feature of the present invention. Modifying the applications themselves is not an economically viable option for minor languages. On the downstream side of the bytecode engine is the display engine, which receives valid output codes (albeit localized) from the bytecode engine, and as such is also substantially unperturbed by the presence of the bytecode engine.

Embodiments of the present invention include a method for converting computer-readable information from a first format to a second format. The method may include the acts of a) receiving information provided by a computer program, the information including data in the first format and a markup tag embedded in said data, b) invoking a stored instruction from a code space corresponding to the embedded markup tag, and c) executing the instruction by operating on the data in the first format to convert it to corresponding data in the second format. The act of receiving the information from the computer program may include the act of receiving an output of an application program. The first format may correspond to a first language and the second format corresponds to a second language. The act of invoking the stored instruction from the code space may include the act of invoking the instruction from a portion of a byte code. In some embodiments, the act of invoking the stored instruction from the code space may include the act of invoking the instruction from a vendor-definable instruction space. In some embodiments, the act of invoking the stored instruction from a vendor-definable instruction space may include the act of invoking the instruction from a Unicode Supplementary Private Use Area. The act of executing the instruction may include interpreting the instruction by an interpreting program. In some embodiments, the act of executing the instruction may include the act of executing at least one flow control step on a computer processor.

The method may also include the act of generating output data in the second format adapted for use by a computer display engine. The method may also include the act of displaying an output in a language corresponding to the second format.

The act of executing the instruction may perform at least one logical operation to convert the data from the first format to the second format.

Embodiments of the present invention may include a computer-readable medium that instructions, which when executed on a computer processor, a) receive a plurality of output codes in a first format from a program, b) parse the received output codes for localization markup tags, c) call stored localization instructions from a code space corresponding to the parsed localization markup tag, and d) process the localization instructions to convert data from the first format to a second format. The medium may also include instructions which when executed on a computer processor produce a display corresponding to the data in the second format.

Embodiments of the present invention may also include a system that includes a storage device including storage areas for an application program, character byte code, and bytecode engine program and localization instructions. The system may also include a processor that executes the application program and produces an application output in a first format and a localization markup tag, and executes the bytecode engine program responsive to the localization markup tag, and acts on the application output in the first format using localization instructions corresponding to the localization markup tag to produce a corresponding output in a second format. The system may also include a display engine that produces a display corresponding to the information in the second format. The storage device may include a vendor-specific character byte code.

Embodiments of the present invention may include a computer the comprises a) means for receiving application output information in a first format, b) means for receiving localization markup tags, c) means for calling up stored instructions from code space corresponding to the localization markup tags, and d) means for executing the stored instructions to convert the application output information from the first format to a second format.

Various features and advantages of the present invention will be apparent from the following description and claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts, wherein

FIG. 3 is a block diagram illustrating processing of output instructions (solid) and localization markup tags (dashed) according to one embodiment;

DETAILED DESCRIPTION

The present system and method include embodiments directed to localization (or internationalization) of computer software. A bytecode engine is provided that takes the output of a computer program in a first (non-localized or partially localized) form and converts it to a second (localized) form based on embedded markup tags generated by the computer program. The markup tags correspond to vendor-specific but unused codes within a code space. The codes correspond to localization flow control instructions that are executed or interpreted to alter the displayed form of the program output from the first to the second form. This allows computer programs to be written without the need to provide different versions of the program for each language or locale in which the program is to be distributed. Rather, the bytecode engine determines whether any localization calls are to be made, and if so, calls up the proper localization instructions and acts on the original application output to produce the localized form of the output. The bytecode engine provides the data used by a display engine to produce the input to a display device (e.g. a computer monitor).

Figure 1:
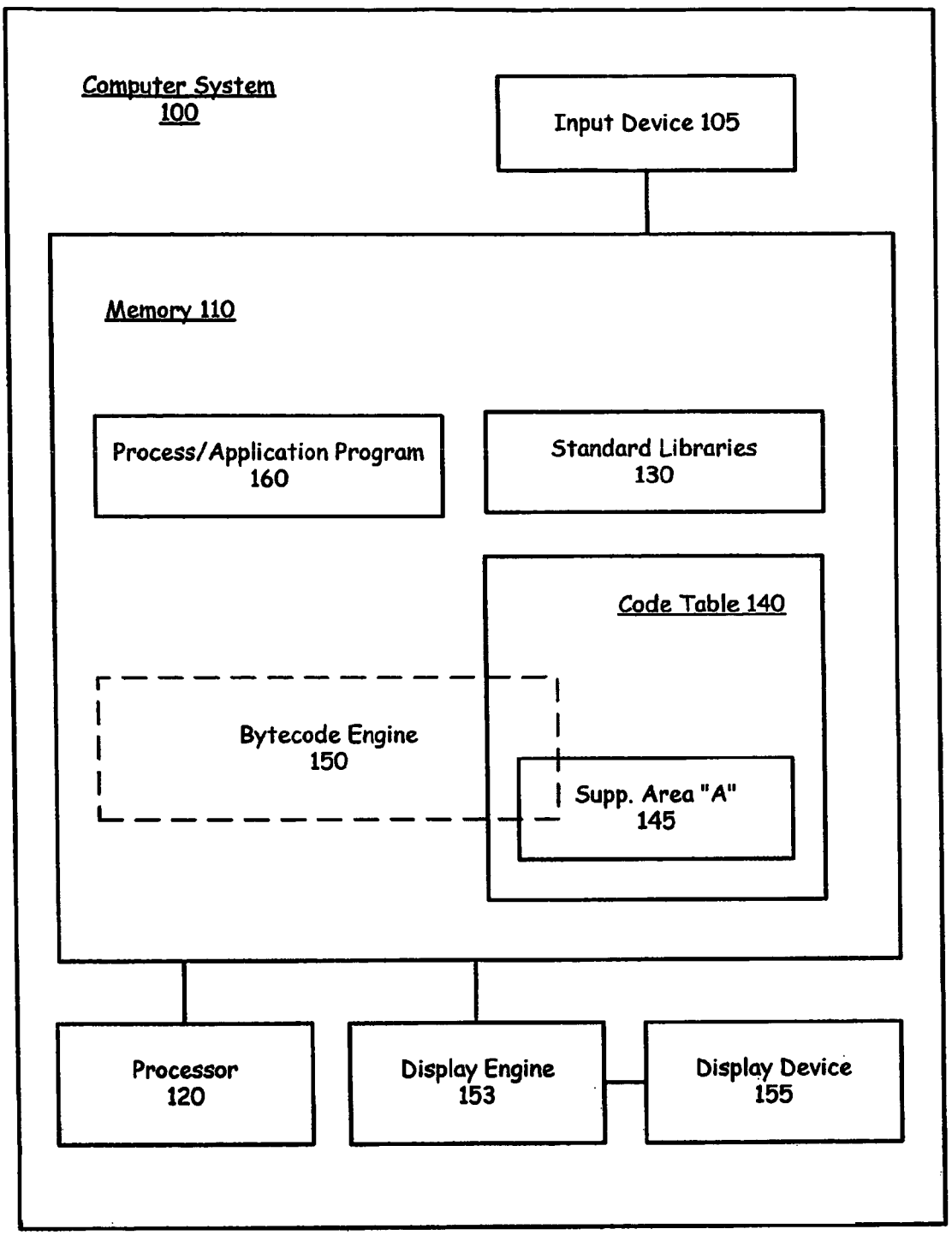
FIG. 1 is a block schematic illustrating a computer system and associated elements according to one embodiment.

One embodiment of the present system and method can be implemented as or provided in a data processing system. For example, as shown in FIG. 1, the data processing system may be a computer system 100. Computer system 100 includes an input device 105, a memory device 110, a processor 120, and a display device 155. The input device 105 is used to provide data and control instructions to the computer system 100, and may be implemented integrally to the other parts of the computer system 100, or it may be a conduit for the receipt of data and instructions from an outside source coupled to the computer system 100. The input device 105 may include hardware and/or software to carry out its function. For example, keyboards, mouse pointers, speech recognizers, video, network cards, and other devices may serve as input devices.

Memory 110 is a storage device that stores data and program instructions, and usually includes a computer-readable medium such as volatile or non-volatile memory, managed by an interface to the other parts of the computer system 100. Information is kept in digital storage locations and blocks in memory 110, and includes code and instructions corresponding to computer application program 160, library 130, and code table 140. Code table 140 includes codes representing various output characters and symbols (such as ASCII or Unicode) to be displayed responsive to the requests of application program 160. Instruction space 145 may be a vendor-assigned portion of the Unicode, as described earlier, that is left free of associations to character groups. Instruction space 145 is part of code table 140. It can contain substantially any information so long as it is properly coded and the calling program understands what to do with this information when it is called. Therefore, the localization instructions in instruction space 145 and the bytecode engine 150 may be designed to operate together to accomplish the desired localization function.

In some embodiments, the instruction space 145 is at least partially occupied with localization instructions. The localization instructions may be provided by the vendor who provides the operating system program for the computer system 100, or another vendor who provides character code specifications used in the computer system 100.

Application program 160 is not limited to the group of programs sold to perform specialized application functions (e.g., typesetting, graphics, multimedia, office productivity applications), but also generally includes any program that runs on computer system 100 and uses the localization process. Thus, application program 160 may include utility programs and operating system software, as well as networked software and streamed applications. In addition to the application program 160, memory 110 may also store the localization bytecode engine 150, to be described in more detail below.

The display engine 153 includes hardware and/or software configured to cause the display of selected forms, graphics, characters, etc. to a display device 155. The display device 155 is for example a computer monitor screen. The end result of the display process is the rendering of visual output onto the display device 155. Some display engines 153 are coupled to a dedicated video memory section that holds data that determines the output sent to the display device 155.

Processor 120 executes program instructions and exchanges data with memory 110. As an example, processor 120 can take instructions stored in a portion of memory 110 and interpret the instructions using an interpreter program or execute the instructions using an executable program running on the processor 120. In general, both interpreted instructions as well as executable instructions are referred to herein as "executable instructions" for simplicity.

Of course, other components, including software and hardware can be included in computer system 100. It is intended by the present disclosure to include permanent and removable computer-readable media, such as magnetic, optical, and semiconductor media in the scope of the present disclosure.

Figure 2:
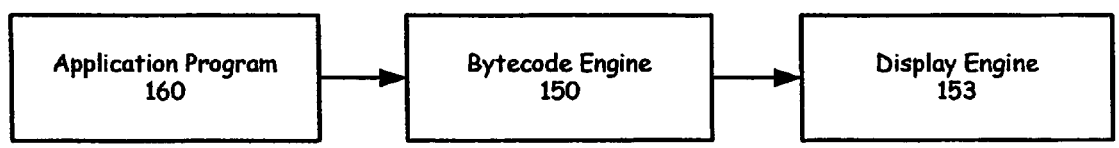
FIG. 2 is a block diagram illustrating the relation between an application program, a bytecode engine, and a display engine according to one embodiment.

The computer system 100 can receive instructions and data to perform localization functions as part of the operating system distribution, or as an update to the operating system software. Alternatively, the instructions can be installed separately as an independent utility application. The bytecode engine 150 executing the localization instructions conceptually resides in a layer between the application program 160 and the display engine 153. FIG. 2 is a simple block diagram illustrating the general relation between a computer application program 160, the bytecode engine 150, and the display engine 153. The bytecode engine 150 is disposed in this embodiment in a conceptual layer between the application program 160 and the display engine 153. The bytecode engine 150 acts to modify, or localize, the output of the application program 160 and the input of the display engine 153.

FIG. 3 illustrates the interconnectivity of the application program 160, the bytecode engine 150, the code table 140, and the display engine 153 according to one embodiment. Application program 160 provides output instructions 200-204 that are eventually converted to a readable displayed output. Output instructions 200-204 can be references to corresponding character codes within, e.g., the Unicode character code space. As an example, output instruction 200 may include the codes utilizable for displaying the English-language text, "Please enter your password."

In addition to the output instructions 200-204, the application program 160 may contain one or more localization markup tags 220-222. The localization markup tags 220-222 are used to indicate to the bytecode engine 150 how the output instructions 200-204 are to be handled, with the effect that the output instructions 200-204 may then be translated or localized. In some embodiments, the localization markup tags 220-222 are embedded into the application program code by the vendor providing the application program 160. In other embodiments, the localization markup tags 220-222 may be provided by an intermediary party modifying an application program 160 that lacks localization markup tags 220-222.

For example, if an application program 160 produces a message "Please Insert Disk 1 in the Disk Drive" this message can be localized or translated to another language if the proper parts of the message are marked up using localization markup tags. One set of localization markup tags may precede the phrase "Disk 1" to identify the phrase as a proper noun, and as a result would identify the phrase as one that does not require localization. Or the noun may be annotated for its properties that will be used in the translation, for example, by indicating it is singular. The localization markup code might look like:
<LOCALIZE:NOUN:SINGULAR> % DISK_NAME </END_LOCALIZE>

Other examples of possible tag-types include those for identifying gender, nouns, verbs, tense, lexical form, etc.

The bytecode engine 150 receives the output instructions 200-204 containing the codes for producing the disk name, but also the codes for calling up the localization instructions from Instruction space 145. These localization instructions in Instruction space 145 then act on input data, e.g. the disk name, and can alter it according to the rules of localization or mutation for the target language or output form desired in the localization process.

Different localization process details may be enacted depending on the language or final localized form of the output. For example, translation from English to French may make use of a subject's gender. Translation to other languages may make use of any number of attributes that can be encoded and used as parameters in a localization algorithm or flow control sequence. For example, Welsh-language mutations require the analysis of individual characters within a word.

The present process is flexible in that it allows for modification, alteration, augmentation and other development of the localization mechanism and algorithms without requiring a corresponding modification of the underlying application program 160 or display engine 153. The process can be expanded and modularized, adding new language rules for example, without needing to hard-code this into the original application program output so long as the localization instruction codes are available. The application program 160 can take the localization markup tags 220-222 and pass on the corresponding Unicode character codes to the bytecode engine 150 at their face values, letting other parts of the computer system 100 be responsible for processing the code values and displaying the appropriate output.

In yet another embodiment, the application program 160 includes instructions capable of parsing the localization markup tags 220-222 within the application program 160 itself. For the purposes of this disclosure, the bytecode engine 150 may be treated as being a separate software object or entity (e.g., a Java virtual machine), although those skilled in the art will appreciate that the bytecode engine 150 may be integrated into other software entities such as the operating system software or the application program 160 running on processor 120.

Figure 4:
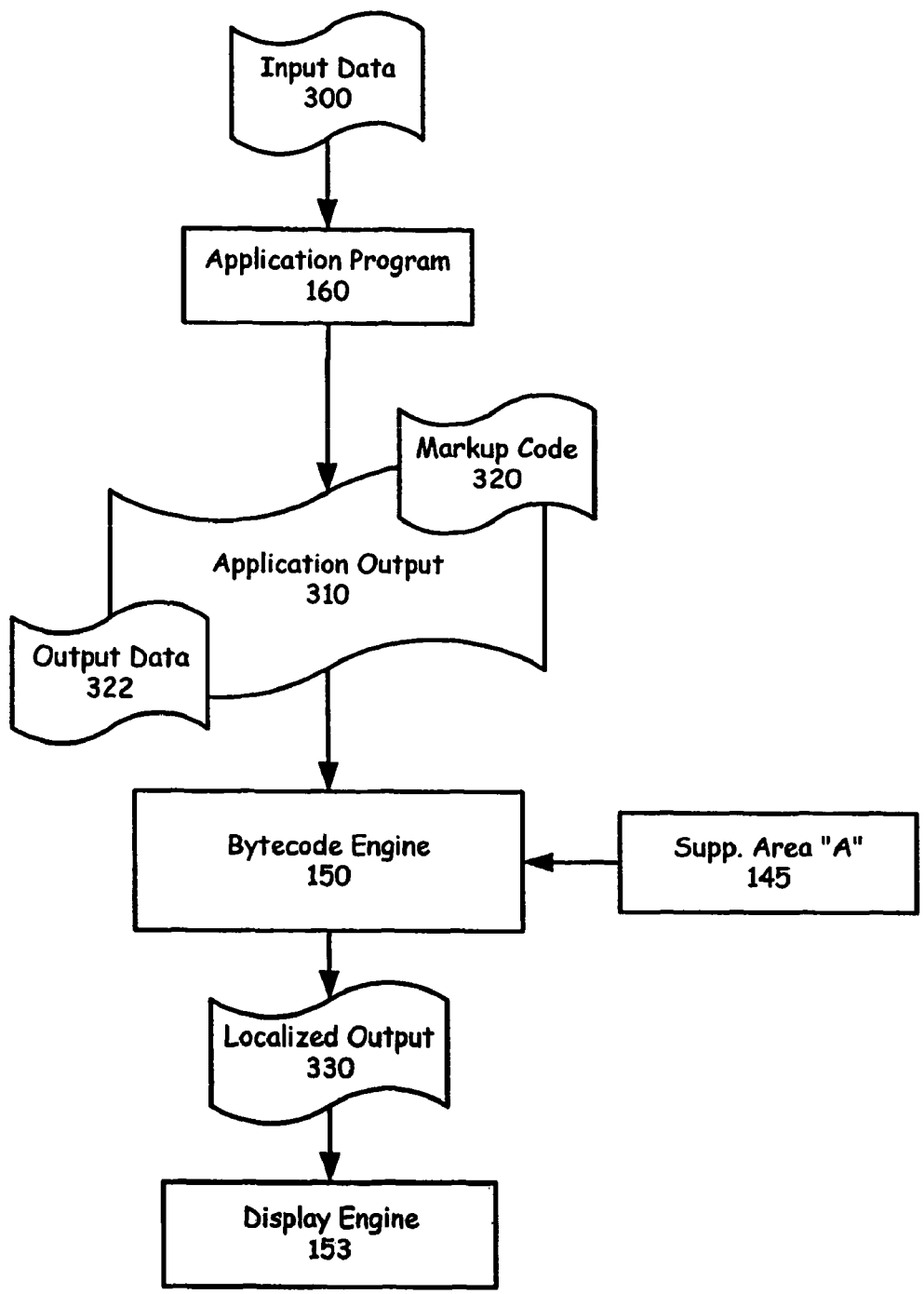
FIG. 4 is a block diagram illustrating the types of data used by the main components of the present system according to one embodiment.

FIG. 4 is a block diagram of a process for localizing a program. An application program 160 receives an input document or input data 300. Not all application programs require input documents on which to operate per se, but the input data 300 may include any data used by the program 160, or none at all. Input data 300 can be a document that is to be used and acted on by the application program 160, or it may be data obtained from other parts of the computer system 100 (e.g. system data), or it may not be explicitly input by any user or external source but rather a product of the application program 160 itself. Some application programs may generate output without explicitly acting on any given input data 300, and are also contemplated by the present system.

The application program 160 operates on the input data 300 according to the program's function, and generates an output, called the application output 310. The application output 310 is non-localized (or partially localized), and is in a form determined by the original language in which the program was written. This may be English for example, and the application output 310 may be a user interface message or other user interface output. The application output 310 may also include embedded markup tags 320 that correspond to valid Unicode character codes. The markup tags 320 contain information regarding aspects of the application output 310 that help the bytecode engine 150 localize the output of the application 160 before it is displayed.

Bytecode engine 150 receives the non-localized (or partially localized) application output 310, including the markup tags 320. The bytecode engine 150 uses the markup tags 320 to retrieve and execute localization instructions stored in the computer system or some other location that is accessible to the bytecode engine 150, such as for example instruction space 145. In particular, the bytecode engine 150 parses the output 310 to determine whether any of the Unicode codes are markup tags 320. If not, the output 310 passes through the bytecode engine 150 on to the display engine 153. On the other hand, if there are localization markup tags 320 in the application output 310, the bytecode engine 150 consults the appropriate code block in the instruction space 145, e.g. Unicode Supplementary Area-A, and retrieves the stored localization instructions corresponding to the markup tags 320. The bytecode engine 150 interprets and/or executes the localization instructions and generates localized output 330.

The bytecode engine 150 provides the localized output 330 (or the original output 310 if no localization markup codes were parsed) to display engine 153. Display engine 153 generates signals corresponding to the desired localized output 330 (or 310) that determine what output will be displayed on the display device 155. Display device 155 displays the localized output corresponding to the original program output. Thus, if the original application output 310 is considered a first form of output, and the localized output 330 is considered a second form of output, the localization process of FIG. 4 converts an output from the first to the second form.

In some embodiments, the process depicted in FIG. 4 takes place seamlessly to the application program 160. That is, application program 160 receives the same input and provides the same output as it would normally do in the absence of a bytecode engine 150. Also, the display engine 153 operates in substantially the same way that it normally would in the absence of the bytecode engine 150 and localization process. The display engine 153 is ready to receive and process characters and glyphs as instructed, so long as these correspond to a format known to the display engine 153.

Figure 5:
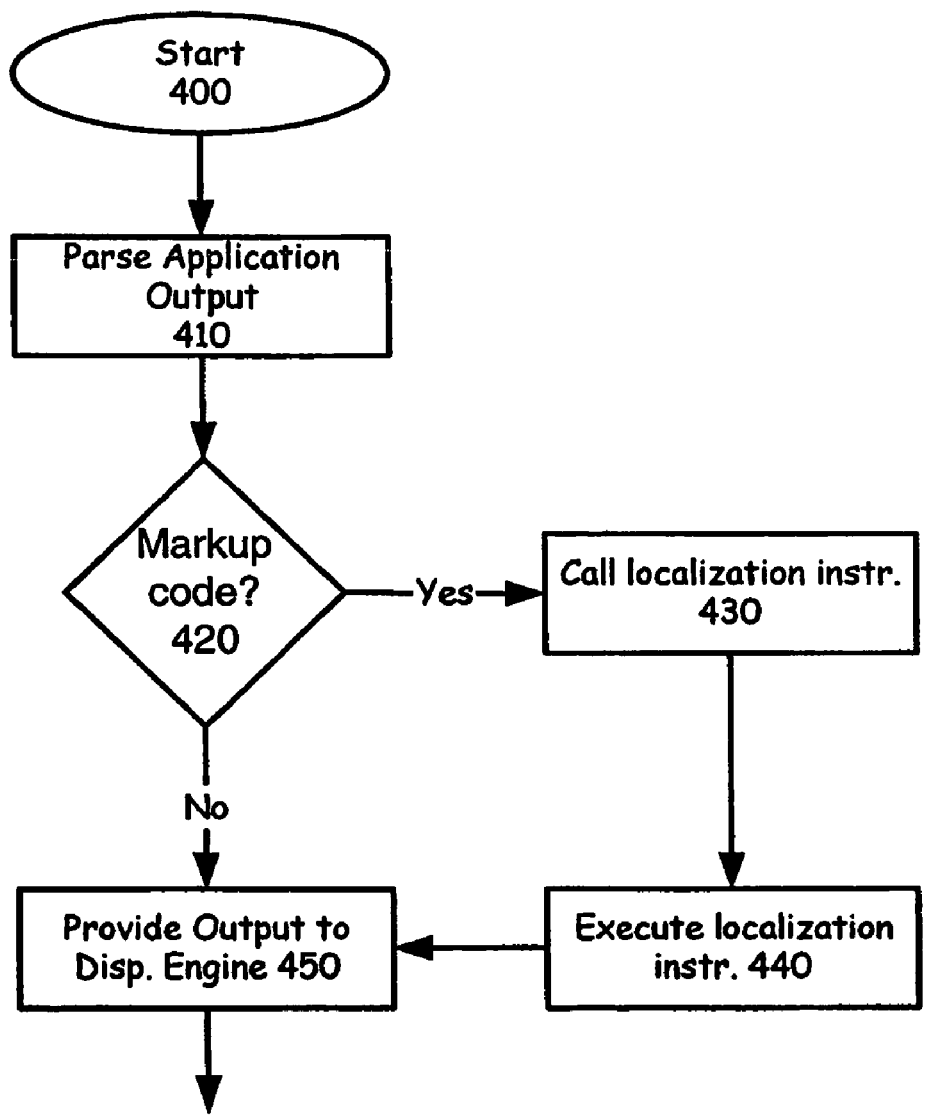
FIG. 5 is a block diagram illustrating the logical process of calling up localization instructions and processing output instructions according to one embodiment.

FIG. 5 illustrates the logical flow of a program such as bytecode engine 150 when parsing application output that may or may not contain localization markup codes (step 400). Bytecode engine 150 parses the application output stream at step 410. A determination of whether localization markup tags are encountered in the output stream is made at step 420. If NO, the output sent to the display engine is unmodified, and is provided to the display engine at step 450. If YES (localization codes encountered), the bytecode engine calls up the corresponding localization instructions at step 430, and executes the localization instructions (from e.g., instruction space 145) at step 440. The localized output of the localization process is provided to the display engine at step 450.

Some examples of instructions, which may be used in the localization process, include the likes of:

| | |
|---|---|
| SKIP [n] | Skip n characters, displaying nothing |
| SKIPW [w][c] | Skip w words and c characters |
| SETVAR [n] [m] | Set variable n to m where m is a constant |
| IF [n] [cond] [m] | Test a variable against a condition (<, =, >, <>, >=, <=) |
| IFVAR [n] [cond] [m] | Same as IF, but comparing a variable to a variable |
| IFCHAR[w][c][x] | Same as IF, but check if character 'c' of word 'w' is 'x' |
| ELSE | Introduce code to run if the condition is false |
| ENDIF | End an "IF" "IFCHAR" or "IFVAR" block |
| EVAL [n] | Scan forward until END[n] in the input but do not print it, just set variables, then return back to program. |
| END [n] | Mark the end of a block |

The EVAL operation is used because some substitutions depend on the text that follows the string rather than the text preceding it. EVAL allows the text to be evaluated and the conditional insertion of the correct string to occur.

The bytecode engine is instructed as to the language it is translating into by use of a special markup tag, e.g. <LOCAL=FRENCH>, that is loaded at the start of the application program execution, or at the start of the execution of the bytecode engine. This tag serves as a global variable, and produces no output itself.

A one-to-one mathematical transformation may be applied to an existing virtual machine language to fit within the instruction space 145. This may be represented, for example, as UA+original_code, where the range of the original code is too large for the instruction space 145, and UA is an offset. That is, simple algebraic transformations from an original instruction space code or address to another instruction space code or address can be used. Also, instruction space 145 may be split into multiple instruction space encodings. This is loosely analogous to the situation where numbers are split into multiple symbols when written in decimal form.

One possible concern raised by the localization process is whether characters, words, etc., will be altered in a way that affects their sort order following the localization. Accordingly, bytecodes may be designed so as to not influence the sort order, length, or comparisons of the text with either other text or regular expressions. In one aspect, bytecodes have "zero collation weight." Alternatively, statements may be placed in locations such as in format strings, which do not influence other aspects of localization like sorting, or as the least significant character in data that will be sorted.

The instructions, codes, and bytecode engine described herein may be recorded on such computer-readable media, duplicated, and transferred over communication channels for execution on one or more computers, being local or remotely operated. One specific example includes distribution of the instructions with a computer operating system for execution on the computer 100 along with other components of the operating system and programs 160. Another specific example includes distribution of the instructions on a removable portable medium such as a compact disc (CD) that can be sold separately, and then installed onto a computer 100 for execution.

The bytecode engine 150 is not limited to a program that acts on character codes, but rather can be any module designed to use software and/or hardware to look up and process instructions corresponding to the localization codes it receives. The bytecode engine 150 ranges in sophistication according to that which it is expected to perform. Bytecode engine 150 can be implemented separately or as part of the computer system's main processor unit. Therefore, a simple scripting language may be employed to carry out the localization. Alternatively, the embedded localization instructions can be of a known or more complex programming environment, such as the C programming language or JAVA. Shared libraries may facilitate the localization process, and in the latter case, a JAVA interpreter is called to interpret the localization instructions, which can perform essentially anything that could be performed in a JAVA script. The localization rules may be stored outside of instruction space 145 by designating secondary storage locations and pointing to that secondary storage space.

Systems in which the above embodiments and others within the scope of the present disclosure might be implemented include computer operating systems and distributions that support standard character code sets or other storage space having vendor-specific space within which localization instructions may be stored.

Upon review of the present description and embodiments, those skilled in the art will understand that modifications and equivalent substitutions may be performed in carrying out the invention without departing from the essence of the invention. Thus, the invention is not meant to be limited by the embodiments described explicitly above, rather it should be construed by the scope of the claims that follow.

What is claimed is:

1. A method for converting computer-readable information from a first format to a second format, comprising:
receiving information provided by a computer program, the information including data in the first format and a markup tag embedded in said data;
invoking a stored instruction from a Unicode vendor specific code space corresponding to the embedded markup tag; and
executing the instruction by operating on the data in the first format to convert it to corresponding data in the second format, the executing includes performing a localization function based on the stored instruction such that the data in the first format is altered based on a desired output form of the second format, wherein the first format corresponds to a first language and the second format corresponds to a second language different from the first language, and a change can be made to the stored instruction without requiring a corresponding change to the computer program, and wherein the markup tag indicates how the data is to be handled, and the instruction from the Unicode vendor specific code space is used to alter the data based on a context dependent rule for translating from the first language to the second language.

2. The method of claim 1, wherein receiving the information from the computer program comprises receiving an output of an application program.

3. The method of claim 1, wherein the first language is English and the second language is French.

4. The method of claim 1, wherein invoking the stored instruction from the code space comprises invoking the instruction from a portion of a byte code.

5. The method of claim 4, wherein invoking the stored instruction from the code space comprises invoking the instruction from a vendor-definable instruction space.

6. The method of claim 5, wherein invoking the stored instruction from a vendor-definable instruction space comprises invoking the instruction from a Supplementary Private Use Area of the Unicode.

7. The method of claim 1, wherein executing the instruction includes interpreting the instruction by an interpreting program.

8. The method of claim 1, wherein executing the instruction comprises executing at least one flow control step on a computer processor.

9. The method of claim 1, further comprising generating output data in the second format adapted for use by a computer display engine.

10. The method of claim 1, further comprising displaying an output in a language corresponding to the second format.

11. The method of claim 1, wherein executing the instruction performs at least one logical operation to convert the data from the first format to the second format.

12. A computer-readable medium, including instructions which when executed on a computer processor:
receive a plurality of output codes in a first format from a program;
parse the received output codes for localization markup tags;
call stored localization instructions from a Unicode vendor specific code space corresponding to the parsed localization markup tag; and
process the localization instructions to convert data from the first format to a second format,
the localization instructions causing the data of the first format to be altered based on a desired output form of the second format, wherein a change can be made to the stored localization instructions without requiring a corresponding change to the program, and
wherein the markup tags indicate how the data is to be handled, and the localization instructions from the Unicode vendor specific code space are used to alter the data based on a context dependent rule for translating from the first format to the second format.

13. The computer-readable medium of claim 12, further comprising instructions which when executed on a computer processor produce a display corresponding to the data in the second format.

14. A computer system, comprising:
a storage device including storage areas for an application program, character byte code, and bytecode engine program and localization instructions;
a processor that executes the application program and produces an application output in first format and a localization markup tag, and executes the bytecode engine program responsive to the localization markup tag, and acts on the application output in the first format using localization instructions from a Unicode vendor specific code space corresponding to the localization markup tag to produce a corresponding output in a second format, such that the application output in the first format is altered based on a desired output form of the second format, wherein a change can be made to the localized instructions without requiring a corresponding change to the application program, and
wherein the markup tag indicates how the application output is to be handled, and the localization instructions from the Unicode vendor specific code space are used to alter the application output based on a context dependent rule for translating from the first format to the second format.

15. The computer system of claim 14, further comprising a display engine that produces a display corresponding to the information in the second format.

16. The computer system of claim 14, wherein the storage device includes a vendor-specific character byte code.

17. A computer system, comprising:
means for receiving application output information in a first format;
means for receiving localization markup tags;
instructions stored in a computer readable medium from a Unicode vendor specific code space corresponding to the localization markup tags; and
means for executing the stored instructions to convert the application output information from the first format to a second format,
wherein the means for executing performs a localization function based on the instructions stored in the computer readable medium, such that the application output information of the first format is altered based on a desired output form of the second format, and a change can be made to the instructions stored in the computer readable medium without requiring a corresponding change to the application output in the first format, and
wherein the markup tags indicate how the application output is to be handled, and the instructions from the Unicode vendor specific code space are used to alter the application output based on a context dependent rule for translating from the first format to the second format.

* * * * *